United States Patent Office 2,828,198
Patented Mar. 25, 1958

2,828,198
PLANT GROWTH REGULANTS AND HERBICIDES

Walter D. Harris, Naugatuck, and Albert W. Feldman, North Haven, Conn., assignors to United States Rubber Company, New York, N. Y., a corporation of New Jersey No Drawing. Application July 21, 1955
Serial No. 523,632
20 Claims. (Cl. 71—2.3)

This invention relates to improvements in plant growth regulants and herbicides.

The chemicals of the present invention are poly(chlorophenoxyethyl) phosphites. These are new chemicals and may be represented by the general formulae $(ROC_2H_4O)_2POH$ and $(ROC_2H_4O)_3P$ in which R is a chlorophenyl radical. These chemicals are effective plant growth regulants and are particularly useful as pre-emergence herbicides.

The compounds of the present invention may readily be prepared by reacting one mole of phosphorous trichloride with three moles of the selected chlorophenoxyethanol preferably in an inert solvent such as benzene, xylene or a chlorinated hydrocarbon solvent. In the absence of an acid acceptor, the bis-phosphites are formed, as illustrated by the following reaction:

$3ROC_2H_4OH + PCl_3 \rightarrow (ROC_2H_4O)_2POH + ROC_2H_4Cl + 2HCl$

By using an equivalent amount of a tertiary amine acid acceptor such as pyridine or dimethylaniline, the tris-phosphites are formed, as illustrated by the following reaction:

$3ROC_2H_4OH + 3C_5H_5N + PCl_3 \rightarrow (ROC_2H_4O)_3P + 3C_5H_5N \cdot HCl$ Specific illustrative examples of the preparation of the compounds of the present invention are shown in Examples I to III.

EXAMPLE I

Preparation of tris-[beta-(2,4-dichlorophenoxy)ethyl] phosphite

To a solution of beta-(2,4-dichlorophenoxy)ethanol (63 g., 0.304 mole) and pyridine (25 g., 0.316 mole) in 75 cc. of benzene, was added dropwise a solution of $PCl_3$ (13.7 g., 0.10 mole) in 75 cc. of benzene. The mixture was stirred thoroughly during the addition and the temperature was maintained below 20° C. by cooling in an ice bath. Pyridine hydrochloride began to precipitate immediately after the addition was started. Stirring was continued for one-half hour after addition was complete. The precipitate was filtered and washed with additional benzene. The combined filtrate was concentrated under reduced pressure to a pot temperature of 135° C./0.53 mm. A 98% yield (64.8 g.) of viscous colorless liquid was obtained. Refractive index, $[n]_D^{20}$ 1.5875. Analysis: Theory, 32.8% Cl and 4.78% P; found, 32.17% Cl and 4.95% P.

EXAMPLE II

Tris-[beta-(4-chlorophenoxy)ethyl] phosphite was prepared by the same procedure described in Example I except that beta-(4-chlorophenoxy) ethanol (53 g., 0.307 mole) was used as the glycol monoether. The filtrate was concentrated to a pot temperature of 165° C./0.65 mm. Yield 95%. Refractive index, $[n]_D^{20}$ 1.5717. Analysis: Theory, 19.5% Cl and 5.68% P; found, 18.8% Cl and 6.08% P.

Using 0.3 mole of other selected chlorophenoxyethanol, the procedure of Example I was followed in preparing tris-[beta-(2,4,5-trichlorophenoxy)ethyl] phosphite. Refractive index, $[n]_D^{26.5}$ 1.5920. Analysis: Theory, 4.12% P and 42.4% Cl; found, 4.35% P and 40.94% Cl.

EXAMPLE III

Preparation of bis-[beta-(2,4-dichlorophenoxy)ethyl] phosphite

Beta-(2,4-dichlorophenoxy)ethanol (62.1 g., 0.3 mole) was dissolved in 50 cc. of benzene. A rapid stream of $CO_2$ was passed in and the solution was cooled in an ice bath while $PCl_3$ (13.75 g., 0.1 mole) was added dropwise at such a rate that the temperature did not rise above 20° C. The flow of $CO_2$ was maintained for about 2 hours. The temperature during this period was maintained at approximately 0° C. The reaction mixture was then topped under reduced pressure (water aspirator) and finally on a mechanical pump to a vapor temperature of 105° C./0.4 mm. and a pot temperature of 170° C. A fore-run of 20.3 g. was collected. 47.9 grams of a viscous colorless liquid was obtained. Refractive index, $[n]_D^{26}$ 1.5738. Analysis: Theory, 30.8% Cl and 6.75% P; found, 30.8% Cl and 6.78% P.

Using 0.3 mole of the appropriate chlorophenoxyethanols, the above procedure was followed in preparing other bisphosphites of the present invention. Yields were quantitative. Refractive index and analytical data were as follows:

Bis-[beta-(4-chlorophenoxy)ethyl] phosphite. Analysis: Theory, 18.1% Cl and 7.91% P; found, 18.17% Cl and 7.98% P.

Bis-[beta-(2,4,5-trichlorophenoxy)ethyl] phosphite. Refractive index, $[n]_D^{26}$ 1.5907. Analysis: Theory, 40.2% Cl and 5.86% P; found 39.5% Cl and 5.91% P.

The poly(chlorophenoxyethyl) phosphites of the present invention are effective plant growth regulants, and are particularly useful as pre-emergence herbicides. The chemicals may be applied as dusts when admixed with a powdered solid carrier, such as various mineral silicates, e. g. mica, talc, pyrophillite and clays. The chemicals may be mixed with surface-active dispersing agents, as herbicidal concentrates, to facilitate emulsification in water and to improve the wetting properties when used as sprays. If desired, the chemicals may be mixed with a powdered solid carrier together with a surface-active dispersing agent so that a wettable powder may be obtained which may be applied directly, or which may be shaken up with water for application in that form. The chemicals may be applied by the aerosol method.

The effectiveness of the chemicals as pre-emergence herbicides when applied to the soil before emergence of weeds is illustrated in the following example:

EXAMPLE IV

Mixtures of 40 mg. of each of the various chemicals to be tested and 35 mg. of a non-herbicidal and non-growth regulating surface-active dispersing agent (condensation product of ethylene oxide and an alkylated phenol) were dispersed in 70 cc. of water. The dispersions of the various chemicals were watered on the surface of the soil in separate 6-inch clay pots immediately after sowing with a mixture of seeds of both broad leaf and grassy weeds. The application rate of the various chemicals was about 20 pounds per acre. Checks were run with an aqueous solution containing only water and the surface-active agent. Other similar tests were run at reduced application rates of the chemicals. The planted seeds included pigweed (Amaranthus spp.), foxtail (Setaria spp.), crabgrass (Digitaris spp.), lamb's quarter (Chenopodium spp.), ragweed (Ambrosia spp.), purslane (*Portulaca oleracea*), and quickweed (Galinsoga sp.).

One month after planting, the treatments were evaluated for percentage weed control of both the broad leaf and the grassy weeds on the basis of 0% control for the weed stand of the checks and 100% control for complete absence of weeds.

The following table shows the weed control of various chemicals of the invention at an application rate of 20 pounds per acre.

| Chemical | Percent Weed Control | |
|---|---|---|
| | Broad Leaved | Grasses |
| (Cl-C₆H₄)-OCH₂CH₂O)₃P | 100 | 85 |
| (Cl-C₆H₄)-OCH₂CH₂O)₂POH | 85 | 70 |
| (Cl₂-C₆H₃)-OCH₂CH₂O)₃P | 100 | 100 |
| (Cl₂-C₆H₃)-OCH₂CH₂O)₂POH | 100 | 100 |
| (Cl₂-C₆H₃)-OCH₂CH₂O)₃P | 100 | 90 |
| (Cl₂-C₆H₃)-OCH₂CH₂O)₂POH | 100 | 100 |

The following table shows the weed control of various chemicals of the invention at an application rate of 4 pounds per acre.

| Chemical | Percent Weed Control | |
|---|---|---|
| | Broad Leaved | Grasses |
| (Cl-C₆H₄)-OCH₂CH₂O)₃P | 100 | 90 |
| (Cl-C₆H₄)-OCH₂CH₂O)₂POH | 100 | 100 |
| (Cl₂-C₆H₃)-OCH₂CH₂O)₃P | 100 | 85 |
| (Cl₂-C₆H₃)-OCH₂CH₂O)₂POH | 100 | 85 |

This application is a continuation-in-part of application Serial No. 454,227, filed September 3, 1954, now abandoned.

Having thus described our invention, what we claim and desire to protect by Letters Patent is:

1. A plant growth regulant and herbicide comprising a poly(chlorophenoxyethyl) phosphite, said phosphite being present in a plant growth regulant concentration.

2. A plant growth regulant and herbicide comprising a poly(monochlorophenoxyethyl) phosphite, said phosphite being present in a plant growth regulant concentration.

3. A plant growth regulant and herbicide comprising a poly(dichlorophenoxyethyl) phosphite, said phosphite being present in a plant growth regulant concentration.

4. A plant growth regulant and herbicide comprising a poly(trichlorophenoxyethyl) phosphite, said phosphite being present in a plant growth regulant concentration.

5. A plant growth regulant and herbicide comprising tris[beta-(2,4-dichlorophenoxy)ethyl] phosphite, said phosphite being present in a plant growth regulant concentration.

6. A plant growth regulant and herbicide comprising bis[beta-(2,4-dichlorophenoxy)ethyl] phosphite, said phosphite being present in a plant growth regulant concentration.

7. A plant growth regulant and herbicide comprising tris[beta-(2,4,5-trichlorophenoxy)ethyl] phosphite, said phosphite being present in a plant growth regulant concentration.

8. A plant growth regulated and herbicide comprising bis[beta-(2,4,5-trichlorophenoxy)ethyl] phosphite, said phosphite being present in a plant growth regulant concentration.

9. A herbicidal composition comprising a poly(chlorophenoxyethyl) phosphite, and a carrier therefor, said phosphite being present in a herbicidal concentration.

10. A herbicidal concentrate composition comprising a poly(chlorophenoxyethyl) phosphite, and a surface-active dispersing agent, said phosphite being present in a herbicidal concentration.

11. A herbicidal composition comprising tris-[beta-(2,4-dichlorophenoxy)ethyl] phosphite, and a carrier therefor, said phosphite being present in a herbicidal concentration.

12. A herbicidal concentrate composition comprising tris[beta-2,4-dichlorophenoxy)ethyl] phosphite, and a surface-active dispersing agent, said phosphite being present in a herbicidal concentration.

13. A herbicidal composition comprising bis-[beta-(2,4-dichlorophenoxy)ethyl] phosphite, and a carrier therefor, said phosphite being present in a herbicidal concentration.

14. A herbicidal concentrate composition comprising bis[beta-(2,4-dichlorophenoxy)ethyl] phosphite, and a surface-active dispersing agent, said phosphite being present in a herbicidal concentration.

15. A herbicidal composition comprising tris-[beta-(2,4,5-trichlorophenoxy)ethyl] phosphite, and a carrier therefor, said phosphite being present in a herbicidal concentration.

16. A herbicidal concentrate composition comprising tris[beta-(2,4,5-trichlorophenoxy)ethyl] phosphite, and a surface-active dispersing agent, said phosphite being present in a herbicidal concentration.

17. A herbicidal composition comprising bis[beta-(2,4,5-trichlorophenoxy)ethyl] phosphite, and a carrier therefor, said phosphite being present in a herbicidal concentration.

18. A herbicidal concentrate composition comprising bis[beta-(2,4,5-trichlorophenoxy)ethyl] phosphite, and a surface-dispersing agent, said phosphite being present in a herbicidal concentration.

19. The method of controlling weeds in soil which comprises treating the soil before emergence of weeds with a poly(chlorophenoxyethyl) phosphite, said phosphite being present in a herbicidal concentration.

20. The method of controlling weeds in soil which comprises treating the soil before emergence of weeds with tris[beta-(2,4-dichlorophenoxy)ethyl] phosphite, said phosphite being present in a herbicidal concentration.

References Cited in the file of this patent

UNITED STATES PATENTS

| | | |
|---|---|---|
| 1,944,530 | Schoenburg | Jan. 23, 1934 |
| 2,220,845 | Moyle | Nov. 5, 1940 |
| 2,230,543 | Mikeska et al. | Feb. 4, 1941 |
| 2,419,354 | Howland et al. | Apr. 22, 1947 |
| 2,573,769 | Lambrech | Nov. 6, 1951 |

OTHER REFERENCES

Proc. Northeast Weed Control Conf., January 7-9, 1953, page 81.